C. E. AKELEY.
OPERATING HANDLE FOR MOTION PICTURE CAMERAS AND PROJECTORS.
APPLICATION FILED FEB. 28, 1917.
1,261,890.
Patented Apr. 9, 1918.
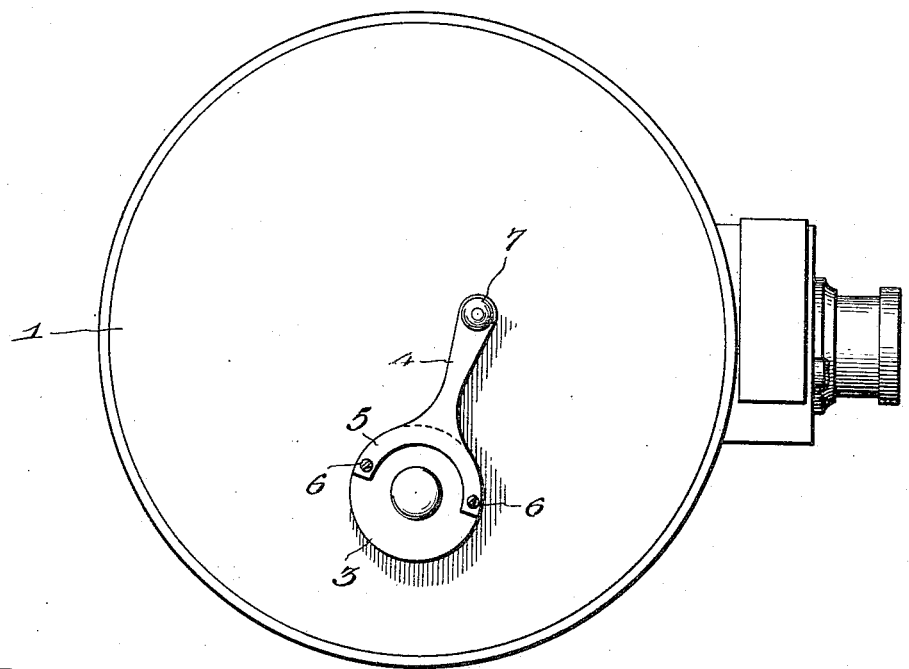
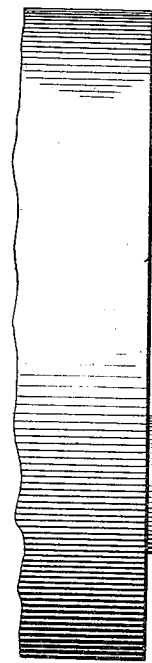
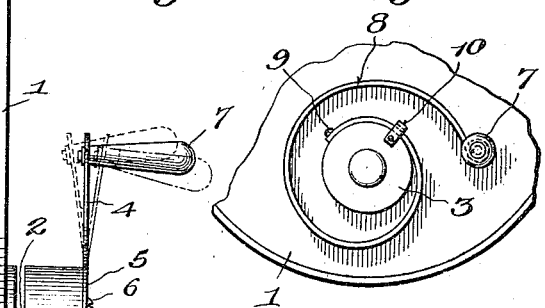
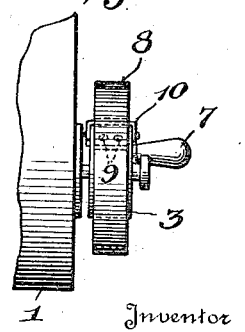
Inventor
Carl E. Akeley
By Percy B. Hills
Attorney

UNITED STATES PATENT OFFICE.

CARL E. AKELEY, OF NEW YORK, N. Y., ASSIGNOR TO AKELEY CAMERA, INC., OF NEW YORK, N. Y., A CORPORATION OF NEW YORK.

OPERATING-HANDLE FOR MOTION-PICTURE CAMERAS AND PROJECTORS.

1,261,890.

Specification of Letters Patent. Patented Apr. 9, 1918.

Application filed February 28, 1917. Serial No. 151,466.

*To all whom it may concern:*

Be it known that I, CARL E. AKELEY, a citizen of the United States, residing in the borough of Manhattan, city of New York, and State of New York, have invented certain new and useful Improvements in Operating-Handles for Motion-Picture Cameras and Projectors, of which the following is a specification.

My invention relates to motion picture cameras and projectors, and has for its objects to provide an improved construction of handle for operating the film thereof, so constructed, first, as to eliminate the imparting of any lateral or end thrust to the camera or projectors during the rotation of the handle, secondly, to permit lateral movement to the hand of the operator without varying the timing of the rotary motion imparted to the film feeding mechanism, and, thirdly, to permit both lateral and end thrust without any variation in the timing.

These objects I accomplish in the manner and by the means hereinafter described and claimed, reference being had to the accompanying drawing, in which:—

Figure 1 is a side elevation of a camera casing, showing my improved handle applied thereto;

Fig. 2 is a rear elevation of a portion of said camera casing, showing my improved handle also in rear elevation;

Fig. 3 is a detail view similar to Fig. 1 showing a slightly modified construction;

Fig. 4 is a side elevation of the modification shown in Fig. 3.

Similar numerals of reference denote corresponding parts in the several views.

In the said drawing, referring to Figs. 1 and 2, the reference numeral 1 denotes a camera casing of the general contour disclosed in a number of Letters Patent heretofore granted to me, such, for instance, as Letters Patent No. 1,177,163, granted March 28, 1916. Projecting through said camera casing at one side is the shaft 2 of the mechanism for feeding the film past the point of exposure, said shaft being provided with a conventional hub 3. To the outer face of said hub 3 is attached my improved handle, the body portion 4 of the same being formed of a flexible metal strip, and being preferably bifurcated at 5 to engage the enlargement 3, to which it is permanently attached by suitable screws 6, the outer end of said body portion 4 being provided with the usual hand portion 7.

As shown in dotted lines in Fig. 2, the flexible nature of the sheet metal body portion 4 of the handle permits it to have a vibratory range of movement, whereby when in use and when the hand portion 7 is being manipulated to feed the film, the handle as a whole will accommodate itself to any movement of the hand of the operator in either direction away from the line of the true circle of rotation. It has been found in practice in operating with a rigid handle that it is practically impossible to prevent the lateral and end thrusts imparted to the handle from being communicated to some degree to the camera or projector, thereby resulting in imperfect pictures, due to this vibration. It also is practically impossible to impart an even rotary motion to the film, due to the fact that there is an inclination to vary from the line of a true circle, which causes an uneven movement to be imparted to the handle. These defects are remedied by my improved flexible handle, which permits such deviation from the true circle without imparting the same to the camera or projector, and without destroying the time rhythm of movement of the hand of the operator.

In Figs. 3 and 4 I have shown a slightly modified construction wherein the connection between the hub 3 of the shaft of the casing 1 and the hand portion 7 is in the form of a flat spiral spring 8 fixed at 9 and clipped at 10 to said hub 3, as shown. By this construction, I provide not only for a lateral yield of the handle, but also for a yield in the line of the end thrust thereon, whereby additional flexibility is provided, and whereby undesirable jerky movement of said handle will be minimized.

While I have shown my improved handles as applied to a camera casing, it will be understood that the same are as readily applicable to feeding the film in a motion picture projector.

Having thus described my invention, what I claim as new and desire to secure by Letters Patent, is:—

1. A handle for motion picture cameras and the like, embodying a hand piece, and a body portion, the latter formed of a flexible metal strip adapted to yield in either direction at an angle to the line of rotation of said handle.

2. A handle for motion picture cameras and the like, embodying a body portion formed of a flat spiral spring.

In testimony whereof, I have hereunto set my hand this 20th day of February, 1917.

CARL E. AKELEY.

Copies of this patent may be obtained for five cents each, by addressing the "Commissioner of Patents, Washington, D. C."